United States Patent
Matsuzaki et al.

[11] Patent Number: 5,636,087
[45] Date of Patent: Jun. 3, 1997

[54] MAGNETIC HEAD SLIDER ASSEMBLY

[75] Inventors: Mikio Matsuzaki, Saitama; Atsushi Iijima, Nagano, both of Japan

[73] Assignee: TDK Corporation, Tokyo, Japan

[21] Appl. No.: 562,756

[22] Filed: Nov. 27, 1995

Related U.S. Application Data

[63] Continuation of Ser. No. 228,854, Apr. 18, 1994.

[30] Foreign Application Priority Data

Apr. 22, 1993 [JP] Japan ................................. 5-117594
Mar. 18, 1994 [JP] Japan ................................. 6-072889

[51] Int. Cl.$^6$ ................................................. G11B 21/21
[52] U.S. Cl. ................................................. 360/103
[58] Field of Search ................................. 360/103, 113, 360/126, 122; 216/66, 67, 64, 94, 52, 22; 204/192.34; 156/643.1; 29/603.07, 603.12, 603.15, 603.16

[56] References Cited

U.S. PATENT DOCUMENTS

| 4,251,841 | 2/1981 | Jacobs | 360/103 |
| 4,673,996 | 6/1987 | White | 360/103 |
| 4,870,519 | 9/1989 | White | 360/103 |
| 5,060,098 | 10/1991 | Gotoh et al. | 360/103 |
| 5,168,407 | 12/1992 | Shimizu et al. | 360/103 |
| 5,347,412 | 9/1994 | Nitta et al. | 360/103 |

FOREIGN PATENT DOCUMENTS

| 62-266726 | 11/1987 | Japan | 360/103 |
| 4-321555 | 11/1992 | Japan . | |
| 4-321556 | 11/1992 | Japan . | |
| 4-321557 | 11/1992 | Japan . | |

*Primary Examiner*—Stuart S. Levy
*Assistant Examiner*—David D. Davis
*Attorney, Agent, or Firm*—Nikaido, Marmelstein, Murray & Oram LLP

[57] ABSTRACT

A slider assembly for a flying magnetic head is made of a ceramic material including a plurality of components having different milling rates from each other. A grain size of one of the components having a lower milling rate is smaller than a grain size of another one of the components having a higher milling rate.

7 Claims, 4 Drawing Sheets

0.5μm  5μm 0.5μm  5μm

MAGNETIC HEAD SLIDER ASSEMBLY

This application is a continuation of application Ser. No. 08/228,854 filed Apr. 18, 1994.

BACKGROUND OF THE INVENTION

1. Field of the Invention

The present Invention relates to a slider assembly for a flying magnetic head and to a process of manufacturing the slider assembly.

2. Description of the Related Art

A typical magnetic head slider assembly has at least one magnetic read/write transducer at its rear end and produces a flying force to float itself above a rotating magnetic disk surface moving at high speed by means of pressurization of air flowing between its air bearing surface (ABS) and the magnetic disk surface.

Attempts have been made to try to adjust the flying height of the slider assembly to an appropriate value by balancing a spring force applied to the slider assembly with the flying force. However, when the slider assembly Is mounted to one end of a support arm which Is driven to swing around its fulcrum positioned at the other end, the flying height will be varied depending upon a radius position of the slider on the rotating disk. This variation in the flying height is caused by angular skew of the slider and by difference of an access velocity of the slider against the rotating disk.

FIG. 1 shows a measured characteristics of such flying height variation, in which the abscissas indicates an access velocity and a skew angle of the slider assembly and the ordinate indicates a flying height of the slider assembly. In the figure, a reference numeral 10 denotes a curve identified by flying height variation characteristics as a function of changes in the access velocity difference, curve 11 denotes a flying height variation as a function of the skew angle, and curve 12 denotes a practical flying height variation characteristics as a function of the composite characteristics of the flying height variations 10 and 11.

A slider head assembly having at least one air bearing surface provided with a specific transverse pressurization contour (TPC) along each side edge of the air bearing surface, so that its flying height is essentially insensitive to skew angle and to access velocity, is described in U.S. Pat. Nos. 4,673,996 and 4,870,519.

FIG. 2 shows a transversal cross sectional view of one fall of the slider head assembly described in the above-mentioned patents. In the figure, a reference numeral 20 denotes a fall extending rearwardly from a front edge of a slider assembly 21 and being projected from one surface of the slider 21 to form an air bearing surface 20a. Elements 22 and 23 denote notched recesses (TPC) formed along both side edges of the air bearing surface 20a of the rail 20, respectively. One of these notched recesses 22 and 23 serves for pressurization and the other serves for expansion of the rail 20 so as to compensate for the above-mentioned change of the flying height due to slider skew angle and/or access velocity. In order to perform this TPC function, the notched recesses 22 and 23 should have a very small depth of about 0.6 to 1.2 µm, and the surface roughness of the recesses 22 and 23 have to be kept within ±0.15 µm.

If such the notched recesses for compensating for a flying height change are milled by an ion milling method, the surface of the recesses may be formed extremely rough so that the depth of one part of the recesses may differ from that of the remaining part. Especially, when the ion beam is applied to the surface an angle which is at or near the perpendicular, the above-mentioned tendency of roughness will be extremely increased. FIGS. 3a and 3b show measured depths of the notched recesses 22 and 23 milled by means of an ion beam applied to the surface at an angle of nearly perpendicular according to the conventional technique, respectively.

If the surface of the recesses is formed rough and therefore the surface roughness is not kept within an effective range of ±0.15 µm, a turbulent air flow will occur at these surfaces to produce a negative force. Thus, a transverse pressurization function caused by these notched recesses will not be obtained.

In case that an incident angle of the ion beam is inclined from zero degree (perpendicular with respect to the air bearing surface), the notched recesses will be formed with a small surface roughness but its stepping side wall will be milled in a tapered shape. If the stepping side wall is formed in a tapered shape, an effective transverse pressurization force cannot be expected.

SUMMARY OF THE INVENTION

It is therefore an object of the present invention to provide a magnetic head slider assembly having at least one air bearing surface which has a recess with a stepping side wall formed in a desired shape and with a smooth surface.

Another object of the present invention is to provide a process of manufacturing the slider assembly having at least one air bearing surface which has a recess with a stepping side wall formed in a desired shape and with a smooth surface, by using an ion milling method.

According to the present invention, a magnetic head slider assembly is made of a ceramic material including a plurality of components having different milling rates from each other. The grain size of one of the components, having a lower milling rate, is smaller than the grain size of another one of the components having a higher milling rate. In other words, according to the present invention, a slider assembly is made of a ceramic material consisting of at least two components having at least first and second milling rates. The first milling rate is lower than the second milling rate, and a grain size of one of the components having the first milling rate Is selected smaller than a grain size of another one of the components having the second milling rate.

Most of the magnetic head slider assemblies are in general made of a ceramic material consisting of two or more components. Since these components have different milling rates from each other, if the ceramic blocks having these composition are milled by an ion milling method, milled surfaces will be formed which are extremely rough as shown in FIGS. 3a and 3b, because the component with a higher milling rate component will be milled faster. However, according to the present invention, since the grain size of the lower milling rate component is smaller than the grain size of the higher milling rate component, the milling rates of both of these components become substantially the same with each other. As a result, a smoothly milled surface can be obtained even if the ion milling beam is directed at a nearly right angle to the surface. Furthermore, a smooth surface can be obtained by a single milling process.

According to the present invention, furthermore, the process of manufacturing a slider assembly has a step of preparing a ceramic material block consisting of at least two components having at least first and second milling rates, the first milling rate being lower than the second milling rate, where in the grain size of the component having the first milling rate being smaller than the grain size of the other of the components having the second milling rate; a step of forming a plurality of thin film transducers for a plurality of the slider assemblies on an upper surface of the ceramic material block; a step of forming a plurality of air bearing surfaces for the plurality of the slider assemblies on a side surface of the ceramic material block; a step of forming a pair of notched recesses along both edges of each air bearing surface of the ceramic material block by an ion milling technique; and a step of cutting the ceramic material block into each slider assembly. Also in this case, since the grain size of the lower milling rate component is smaller than the grain size of the higher milling rate component, both the milling rates of these components are substantially the same as each other which procedures a smoothly milled surface even if an ion beam directed at nearly a right angle to the milled surface is used.

The notched recesses forming step preferably includes a step of forming the notched recesses by means of an ion beam with an incident angle of 0 to 20 degrees with respect to the air bearing surface.

It is preferred that the ceramic material block has a composition of $Al_2O_3$—TiC.

A ratio of the grain sizes of the components of TiC and $Al_2O_3$ may be 1.0:1.3 to 3.0.

It is also preferred that the ceramic material block has a composition selected from a group of $Al_2O_3$—TiC—$TiO_2$, $Al_2O_3$—$ZrO_2$ and $Al_2O_3$—SiC.

Further objects and advantages of the present invention will be apparent from the following description of the preferred embodiments of the invention as illustrated in the accompanying drawings.

DESCRIPTION OF THE PREFERRED EMBODIMENTS

Figure 4:
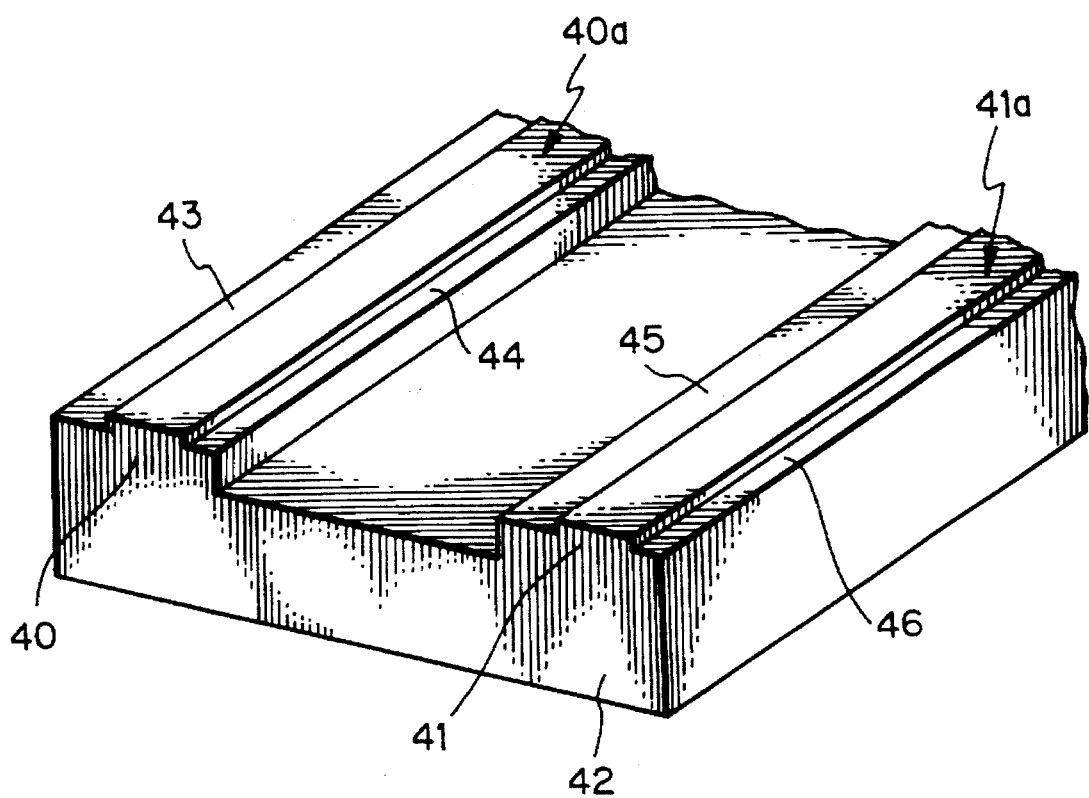
FIG. 4 shows an oblique view of a part of a magnetic head slider assembly in a preferred embodiment according to the present invention.

FIG. 4 is an oblique view schematically illustrating a partial structure of a rear side part of a magnetic head slider assembly in a preferred embodiment according to the present invention.

In the figure, reference numerals 40 and 41 denote a pair of rails extending rearwardly from a front edge of a slider assembly 40 and being projected from one surface of the slider 40 to form air bearing surfaces 40a and 41a, respectively. Notched recesses (TPC) 43 and 44 and notched recesses (TPC) 45 and 46 are formed along both side edges of the respective air bearing surfaces 40a and 41a of the rails 40 and 41. The wider notched recesses 43 and 45 are formed at inner side edges of the air bearing surfaces 40a and 41a corresponding to an inside radius of a rotating magnetic disk, and the narrower notched recesses 44 and 46 are formed at outer side edges of the air bearing surfaces 40a and 41a corresponding to an outside radius of the rotating magnetic disk. The notched recesses 43 and 45 serve for pressurization and the other notched recesses 44 and 46 serve for expansion of the rails 40 and 41, so as to produce a transverse pressurization force for the slider assembly 42 resulting a change of the flying height due to slider skew angle and/or access velocity to compensation. In order to perform this TPC function, the notched recesses 43 to 46 have a very small depth of about 0.6 to 1.2 μm.

The slider assembly 42 is made of a ceramic material having a composition of $Al_2O_3$ (up to 70 weight %) and TiC (up to 30 weight %). In general, if the size of particles of TiC is substantially the same as that of $Al_2O_3$, the ratio of milling rates of TiC and $Al_2O_3$, by means of an ion beam applied to the surface at an angle of the perpendicular, will be about 1.0:1.5. In this embodiment, the grain size of the TiC is selected to be smaller than that of $Al_2O_3$ so as to increase the milling rate of the TiC. As a result, the milling rates of both the TiC and the $Al_2O_3$ becomes the same with respect to each other. In practice, the ratio of the grain sizes of TiC and $Al_2O_3$ will be determined to 1.0:1.3 to 3.0. Because of a crystal face effect which may be equivalent to that occurring with the increased incident angle of an ion beam, the milling rate increases with a smaller grain size without practically changing the incident angle.

A process for manufacturing a slider assembly 42 having such the notched recesses 43 to 46 will be now described.

First, a ceramic wafer (substrate) having a composition of $Al_2O_3$—TiC in which the ratio of grain sizes of TiC and $Al_2O_3$ is 1.0:1.3 to 3.0 respectively, is prepared. The thickness of the ceramic wafer will be substantially equal to a slider surface length. Then, a plurality of magnetic head transducers arranged in a matrix are formed on this ceramic wafer by means of a thin film technology. The ceramic substrate is then cut into a plurality of rectangular bars each of which has a plurality of the thin film transducers aligned in one row along the bar. Thereafter, for each slider block, a pair of rails 40 and 41 are manufactured by forming a recess between the rails 40 and 41 by means of mechanical processing such as grinding and lapping, or by chemical or physical processing such as chemical etching, plasma etching or ion milling.

After forming the rails, the surfaces of these rails are polished to form air bearing surfaces. Then, the aforementioned notched recesses (43 to 46) are formed along both side edges of the respective air bearing surfaces of the rails by an ion milling process. This ion milling process has following steps. (1) The slider surface (air bearing surfaces) is spin-coated with a photo resist material to make a photo resist layer. (2) A part of the coated photo resist layer is removed to make an ion beam mask. The removed part corresponds to the pattern of the notched recesses to be formed. (3) The air bearing surfaces coated with the ion beam mask of the photo resist layer are ion-milled by a substantially perpendicular beam having an incident angle of about 0 to 20 degrees. The milled depth of the air bearing surfaces, namely of the notched recesses, is about 0.6 to 1.2 μm in this case. (4) The photo resist mask is then removed. Thereafter, the bars are cut into each slider assembly.

Instead of using such the photo resist mask, a mask using a thick dry film resist layer laminated on the slider surface can be used as described in U.S. Pat. No. 4,564,585. A two layers mask composed of a metal mask and a photo resist mask laminated each other can be also used.

Figure 1:
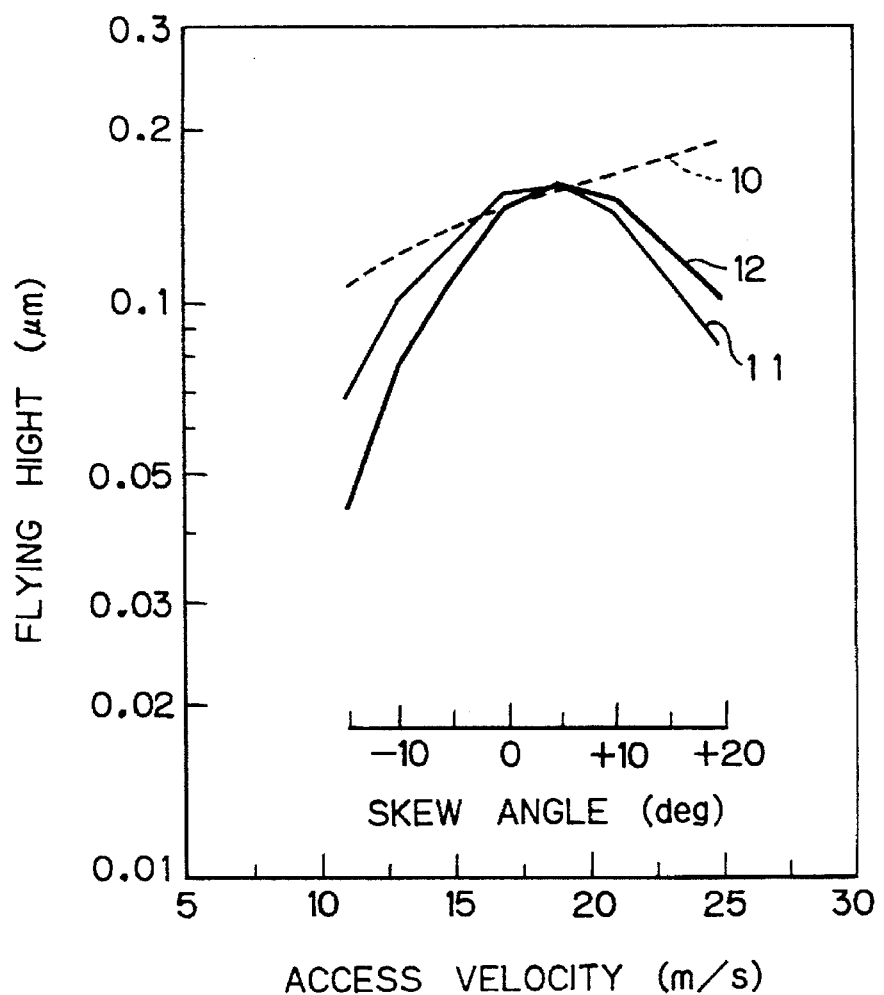
FIG. 1 shows a measured characteristics of flying height variations of a typical magnetic head slider assembly according to a conventional art.
Figure 2:
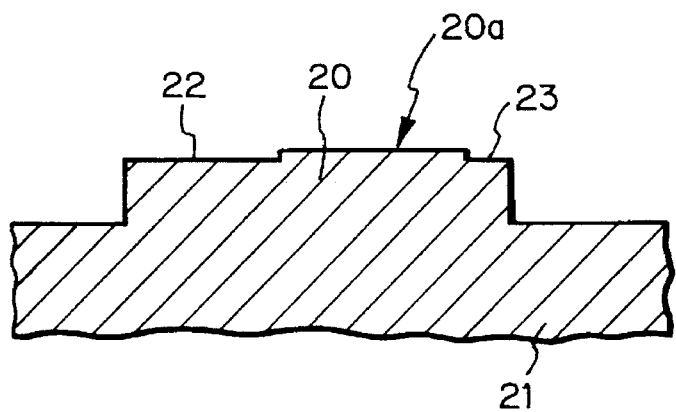
FIG. 2 shows a transversal cross sectional view of one rail of a typical magnetic head slider assembly according to a conventional art.
Figure 3A:
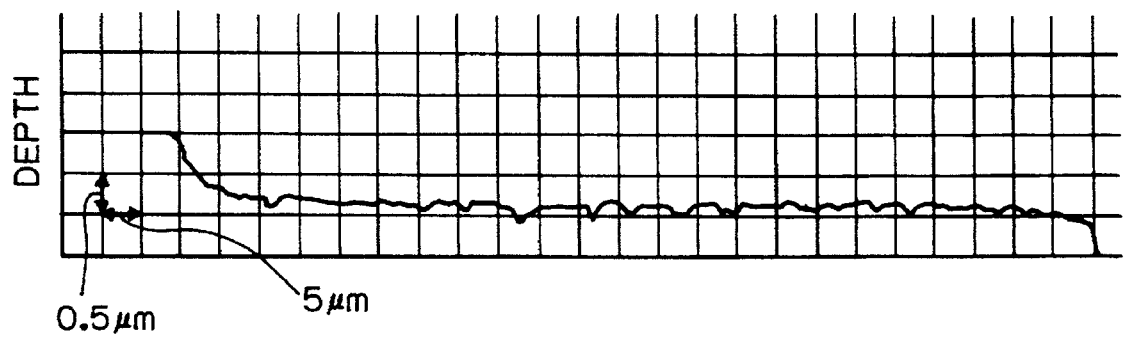
FIGS. 3a and 3b show measured depths of notched recesses of the typical magnetic head slider assembly according to a conventional art.
Figure 3B:
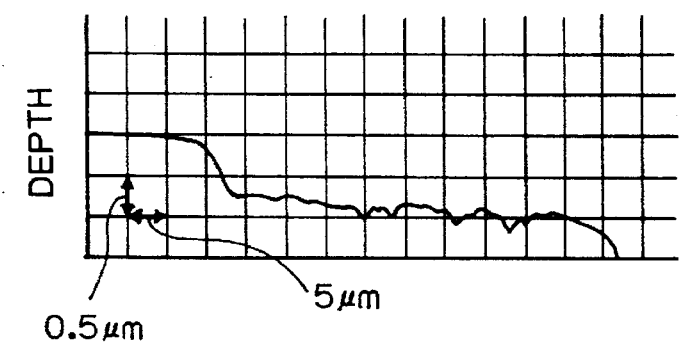
Figure 5A:
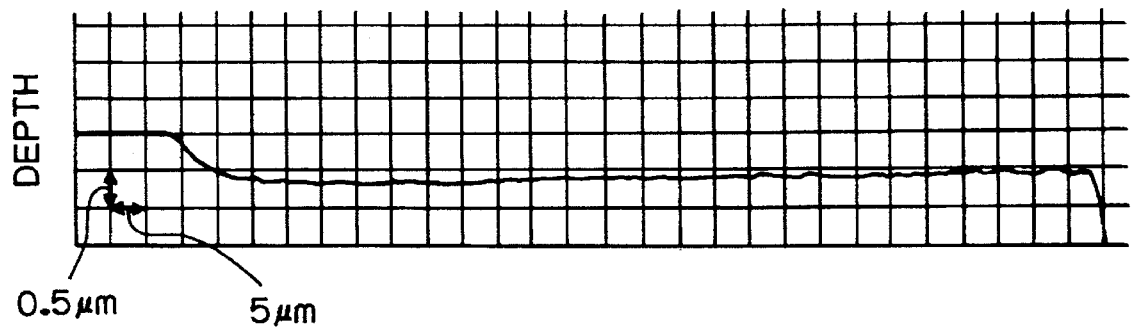
FIGS. 5a and 5b show measured depths of notched recesses of the magnetic head slider assembly of the embodiment shown in FIG. 4.
Figure 5B:
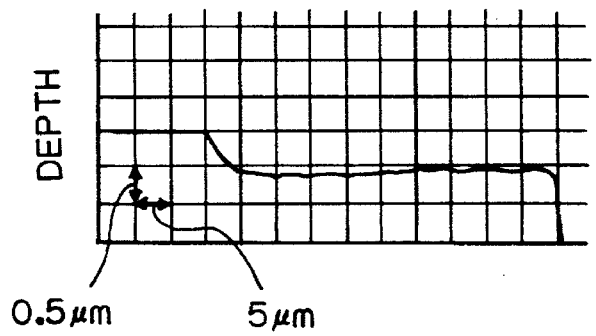

FIGS. 5a and 5b show measured depths of the notched recesses 43 (45) and 44 (46) milled by means of an ion beam applied to the air bearing surface at an angle of near the perpendicular according to the above-mentioned embodiment, respectively. As will be apparent from a comparison of FIGS. 5a and 5b with FIGS. 3a and 3b, the surfaces of the notched recesses of this embodiment has less irregularity and is far smoother than that made by the conventional technique. Thus, notched recesses with a very accurate depth can be obtained and therefore unnecessary negative force will not be produced and resulting highly effective transversal pressurization function can be expected. Furthermore, since the milling is completed by one process using only a beam which is nearly perpendicular to the air bearing surfaces, the notched recesses can be formed with perpendicular, not tapered, stepping side walls resulting in an effective transverse pressurization force to be ensured. Therefore, the flying height change due to the slider skew angle and/or access velocity can be effectively compensated for so that the same flying height can be maintained from an inside track to an outside track of the rotating magnetic disk. As a result, the slider assembly according to this embodiment can be utilized in a magnetic read/write head for a high density recording using a zone-bit method.

For a ceramic substrate, various material with different compositions can be used other than $Al_2O_3$—TiC. For example, $Al_2O_3$—TiC—$TiO_2$, $Al_2O_3$—$ZrO_2$ or $Al_2O_3$—SiC may be used. In case of utilizing these materials, the grain size of the component having the lower milling rate is necessary by selected to one smaller than that of the component having a higher milling rate so that the milling rates of both the components are substantially equal to each other.

In the aforementioned embodiment, the present invention is applied to a slider assembly having an ion milled TPC notched recesses for compensating a flying height variation. However, it is apparent that the present invention can be applied to a negative pressure slider assembly, described in U.S. Pat. No. 4,564,585, having an ion milled recess for producing a negative pressure to provide a very narrow clearance between the slider and a rotating disk.

Many widely different embodiments of the present invention may be constructed without departing from the spirit and scope of the present invention. It should be understood that the present invention is not limited to the specific embodiments described in the specification, except as defined in the appended claims.

What is claimed is:

1. A ceramic magnetic head slider comprising at least one surface comprising an air bearing surface and at least one recess surface disposed adjacent thereto:

wherein at least said recess surface comprises grains of a plurality of different composition ceramic components, each of which components has a different inherent ion beam millable rate;

wherein each of said different composition ceramic components have different average grain sizes;

wherein each different average grain size of each different composition ceramic component has a different ion beam milling rate, and wherein the ion beam milling rates of the grains of each different specific composition ceramic component of the same grain size is different;

wherein the average grain sizes of each of said different composition ceramic components is selected to be substantially proportional to its inherent ion beam milling rate such that the actual ion beam milling rates of the different average grain sizes of the different composition ceramic components, respectively, are all substantially the same; and wherein said recess surface, made by ion beam milling, is substantially smoother than would have been the case if said recess surface was made by ion beam milling of a blank comprising the same different composition ceramic components where each had substantially the same average size grains.

2. The slider as claimed in claim 1 wherein said recess surface comprises:

a larger average grain size of a first composition ceramic component having a higher inherent ion beam milling rate; and a smaller average grain size of a second composition ceramic component having a lower inherent ion beam milling rate:

wherein a specific grain size of said first ceramic component has higher ion beam milling rate than the same grain size of said second ceramic component; and wherein the grain size of said second ceramic component is sufficiently smaller than the grain size of said first ceramic component that the actual ion beam milling rate of said grains of said components is substantially the same.

3. The slider as claimed in claim 2 wherein said ceramic components comprise, respectively, TiC and $Al_2O_3$.

4. The slider as claimed in claim 3 wherein the ratio of the grain sizes of said TiC and $Al_2O_3$., respectively is 1.0:1.3 to 3.0.

5. The slider as claimed in claim 2 wherein said ceramic components comprise TiC, $Al_2O_3$ and $TiO_2$.

6. The slider as claimed in claim 2 wherein said ceramic components comprise $Al_2O_3$ and $ZrO_2$.

7. The slider as claimed in claim 2 wherein said ceramic components comprise $Al_2O_3$ and SiC.

* * * * *